United States Patent
Xu et al.

(10) Patent No.: US 12,267,903 B2
(45) Date of Patent: Apr. 1, 2025

(54) RNA UPDATING IN SDT PROCEDURE

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Murtaza A. Shikari, Mountain View, CA (US); Ralf Rossbach, Munich (DE); Sarma V. Vangala, Campbell, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 17/438,281

(22) PCT Filed: Jan. 14, 2021

(86) PCT No.: PCT/CN2021/071882
§ 371 (c)(1),
(2) Date: Sep. 10, 2021

(87) PCT Pub. No.: WO2022/151231
PCT Pub. Date: Jul. 21, 2022

(65) Prior Publication Data
US 2023/0276520 A1 Aug. 31, 2023

(51) Int. Cl.
*H04W 76/27* (2018.01)
*H04W 76/19* (2018.01)
*H04W 76/20* (2018.01)

(52) U.S. Cl.
CPC ........... *H04W 76/20* (2018.02); *H04W 76/19* (2018.02)

(58) Field of Classification Search
CPC ..... H04W 76/19; H04W 76/20; H04W 76/27; H04W 76/38
See application file for complete search history.

(56) References Cited

U.S. PATENT DOCUMENTS

2018/0092157 A1 3/2018 Chen
2018/0270713 A1 9/2018 Park et al.
(Continued)

FOREIGN PATENT DOCUMENTS

KR 20140115923 10/2014
WO 2018127030 A1 7/2018
(Continued)

OTHER PUBLICATIONS

Lenovo, et al., "Analysis on RA Selection and RNAU"; 3GPP TSG-RAN WG2, Meeting #112 (electronic); R2-2009873; Nov. 2020; 3 pgs.
(Continued)

*Primary Examiner* — Phuc H Tran
(74) *Attorney, Agent, or Firm* — Kowert, Hood, Munyon, Rankin & Goetzel, P.C.

(57) ABSTRACT

Apparatuses, systems, and methods for a user equipment device (UE) to perform a method for supporting a periodical radio access network (RAN) notification area (RNA) mechanism when small data transmission (SDT) is enabled for a user equipment device (UE). The method may include the UE receiving, from a base station, an indication enabling an SDT procedure along with an indication of an RNA timer configuration, transitioning, to a radio resource control (RRC) inactive state, and initiating an RNA timer based on the RNA timer configuration. The UE may, upon initiation of the SDT procedure, stop the RNA timer and, upon termination of the SDT procedure, start the RNA timer. During the SDT procedure, the UE may receive any of an SDT termination indication, an SDT subsequent transmission indication, or an SDT subsequent transmission termination indication that may include an updated RNA timer configuration (and/or RNA timer reconfiguration).

20 Claims, 16 Drawing Sheets

(56) References Cited

U.S. PATENT DOCUMENTS

| | | |
|---|---|---|
| 2018/0302914 A1 | 10/2018 | Da Silva |
| 2020/0053791 A1 | 2/2020 | Ozturk |
| 2020/0128484 A1 | 4/2020 | Su et al. |
| 2021/0410180 A1* | 12/2021 | Tsai ...................... H04W 76/11 |
| 2023/0030443 A1* | 2/2023 | Chen ..................... H04W 76/38 |
| 2023/0121314 A1* | 4/2023 | Tsai ........................ H04W 8/22 |
| | | 370/328 |
| 2023/0284289 A1* | 9/2023 | Watts .................... H04W 48/20 |
| | | 370/329 |
| 2023/0328835 A1* | 10/2023 | Wu ....................... H04W 76/27 |
| | | 370/329 |
| 2023/0413207 A1* | 12/2023 | Yue ................... H04W 56/0045 |

FOREIGN PATENT DOCUMENTS

| | | |
|---|---|---|
| WO | 2020088097 A1 | 5/2020 |
| WO | 2021136474 | 7/2021 |

OTHER PUBLICATIONS

International Search Report and Written Opinion; International Application No. PCT/CN2021/071882; mailed Oct. 20, 2021; 8 pgs.

Extended European Search Report for 21918439.7; Jun. 18, 2024.

\* cited by examiner

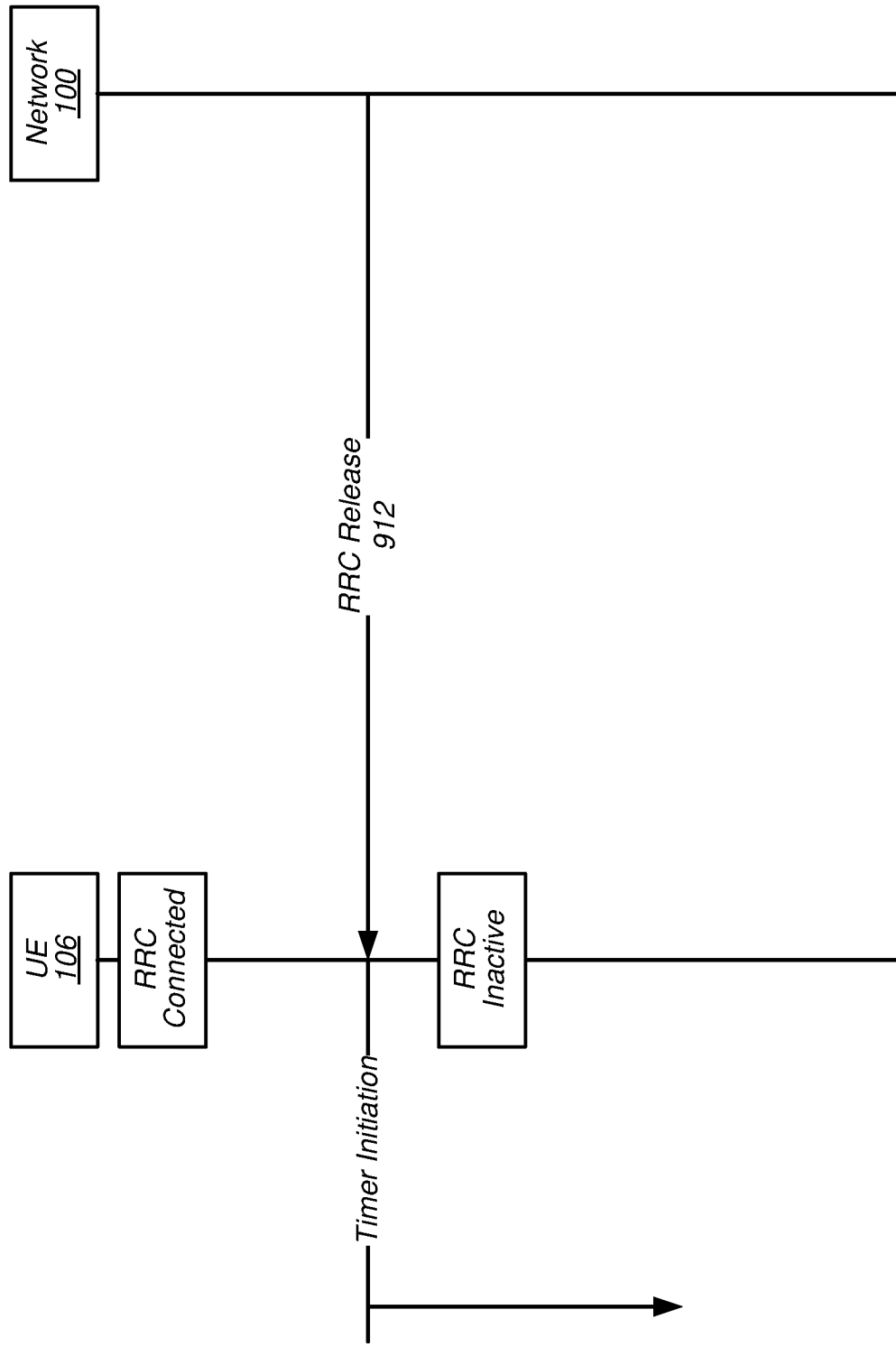

RNA UPDATING IN SDT PROCEDURE

PRIORITY CLAIM INFORMATION

This application is a U.S. National Stage application of International Application No. PCT/CN2021/071882, filed Jan. 14, 2021, titled "RNA Updating in SDT Procedure", which is hereby incorporated by reference in its entirety.

FIELD

The disclosure relates to wireless communications including apparatuses, systems, and methods for supporting a periodical RNA mechanism as part of an SDT procedure, e.g., in 5G NR systems and beyond.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Aspects relate to wireless communications including apparatuses, systems, and methods for supporting a periodical RNA mechanism as part of an SDT procedure, e.g., in 5G NR systems and beyond.

For example, in some aspects, a user equipment device (UE), such as UE 106, may be configured to perform a method for supporting a periodical radio access network (RAN) notification area (RNA) mechanism when small data transmission (SDT) is enabled for a user equipment device (UE). The method may include the UE receiving, from a base station, such as base station 102, an indication enabling an SDT procedure along with an indication of an RNA timer configuration, transitioning, to a radio resource control (RRC) inactive state, and initiating an RNA timer based on the RNA timer configuration. The UE may, upon initiation of the SDT procedure, stop the RNA timer and, upon termination of the SDT procedure, start the RNA timer. During the SDT procedure, the UE may receive any of an SDT termination indication, an SDT subsequent transmission indication, or an SDT subsequent transmission termination indication that may include an updated RNA timer configuration (and/or RNA timer reconfiguration).

As another example, in some aspects, a base station, such as base station 102, may be configured to perform a method for supporting a periodical RNA mechanism when SDT is enabled for a UE, such as UE 106. The method may include the base station transmitting, to the UE, an indication enabling an SDT procedure along with an indication of an RNA timer configuration, receiving, from the UE, an SDT transmission during the SDT procedure, and reconfiguring the RNA timer via an SDT procedure transmission to the UE. The SDT procedure transmission may include at least one of an SDT termination indication, an SDT subsequent transmission indication, or an SDT subsequent transmission termination indication.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various aspects is considered in conjunction with the following drawings, in which:

FIG. 9A illustrates an example of a UE receiving a timer configuration in an RRC release message, according to some aspects.

Figure 1A:
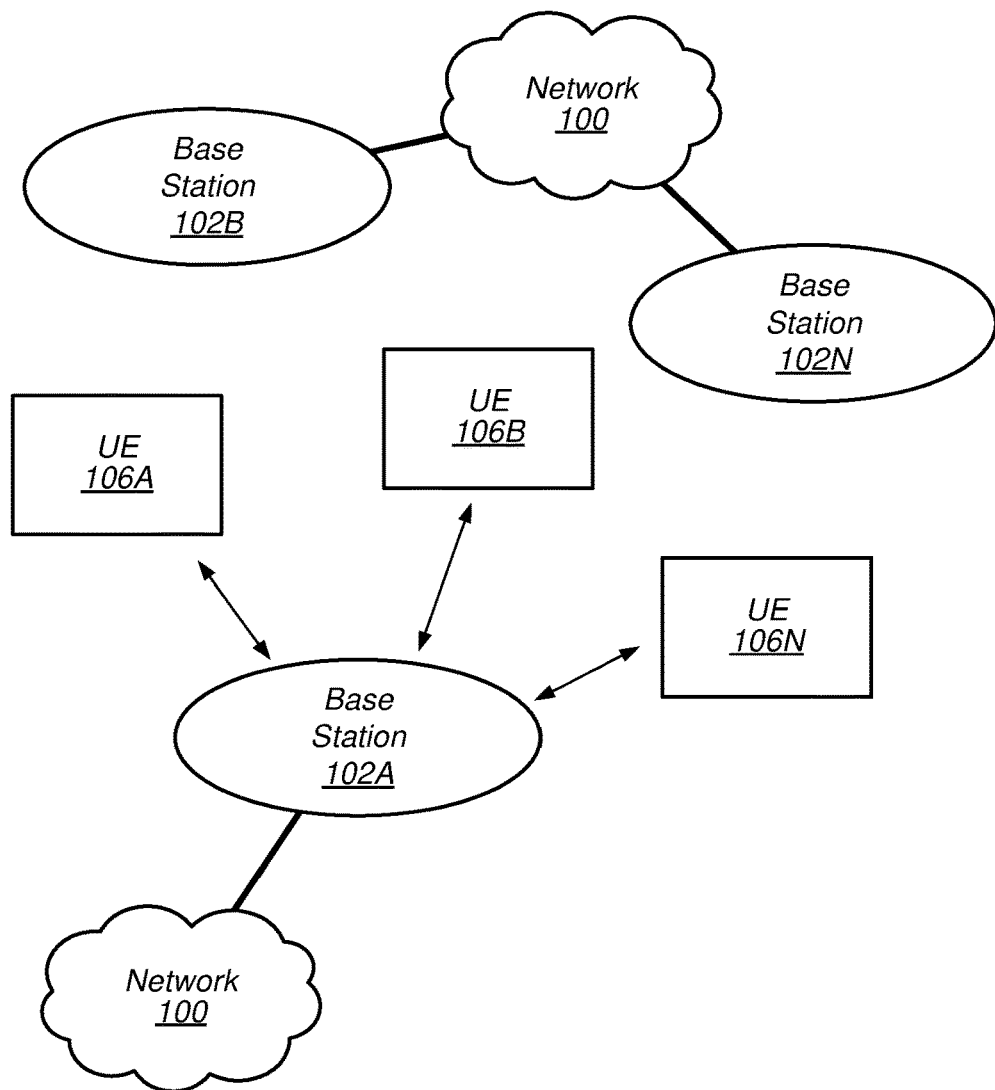
FIG. 1A illustrates an example wireless communication system according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones, portable gaming devices, laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
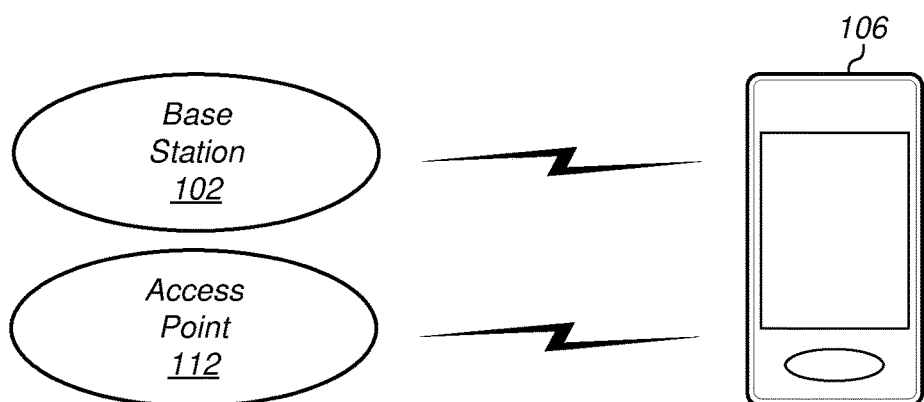
FIG. 1B illustrates an example of a base station and an access point in communication with a user equipment (UE) device, according to some aspects.

FIGS. 1A and 1B: Communication Systems

FIG. 1A illustrates a simplified example wireless communication system, according to some aspects. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some aspects. The UE 106 may be a device with both cellular communication capability and non-cellular communication capability (e.g., Bluetooth, Wi-Fi, and so forth) such as a mobile phone, a handheld device, a computer or a tablet, or virtually any type of wireless device.

The UE 106 may include a processor that is configured to execute program instructions stored in memory. The UE 106 may perform any of the method aspects described herein by executing such stored instructions. Alternatively, or in addition, the UE 106 may include a programmable hardware element such as an FPGA (field-programmable gate array) that is configured to perform any of the method aspects described herein, or any portion of any of the method aspects described herein.

The UE 106 may include one or more antennas for communicating using one or more wireless communication protocols or technologies. In some aspects, the UE 106 may be configured to communicate using, for example, CDMA2000 (1xRTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
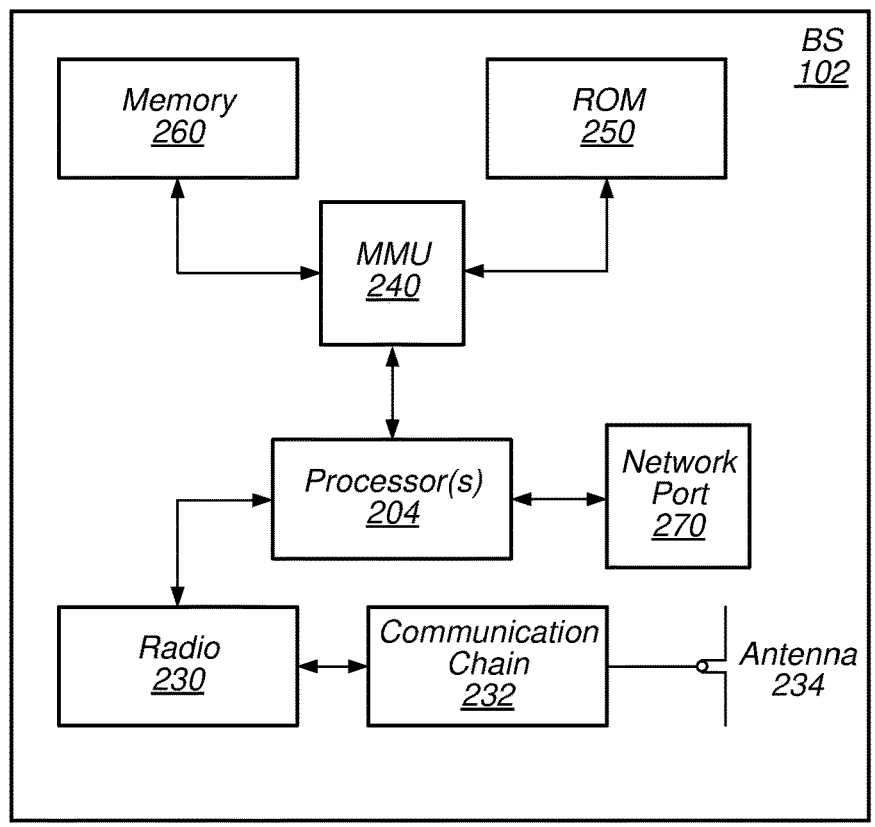
FIG. 2 illustrates an example block diagram of a base station, according to some aspects.

FIG. 2: Block Diagram of a Base Station

Figure 3:
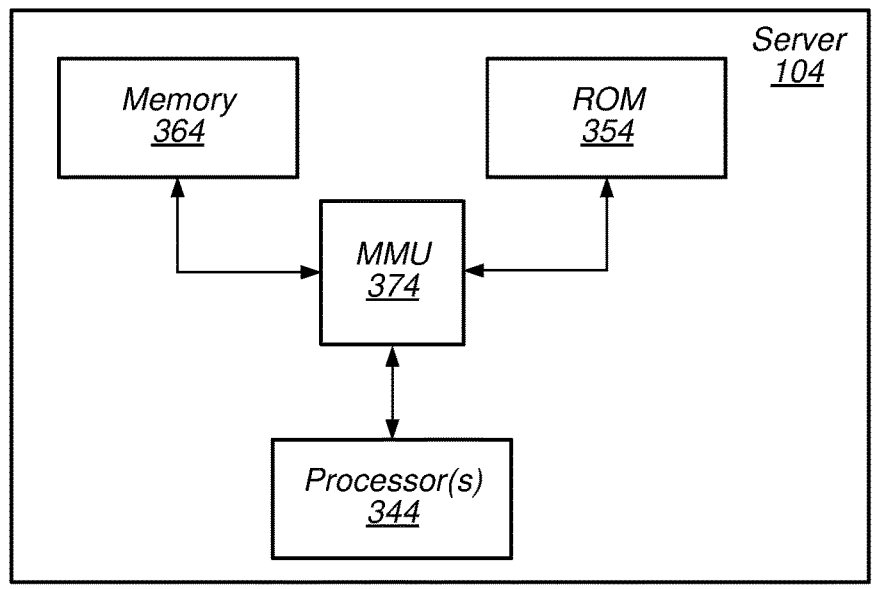
FIG. 3 illustrates an example block diagram of a server according to some aspects.

FIG. 2 illustrates an example block diagram of a base station 102, according to some aspects. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some aspects. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some aspects, the server 104 may be part of a radio access network, such as a 5G New Radio (5G NR) radio access network. In some aspects, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
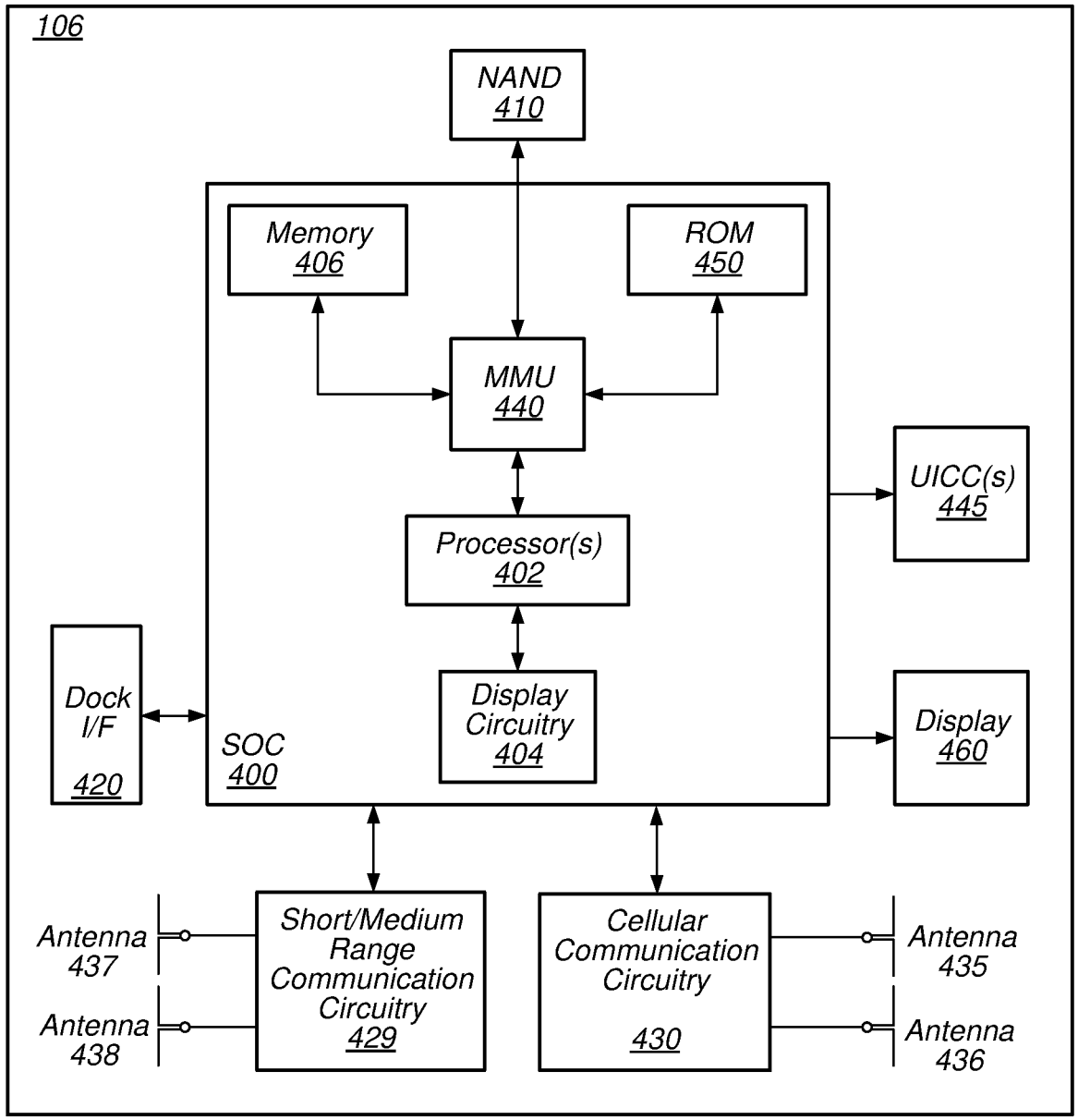
FIG. 4 illustrates an example block diagram of a UE according to some aspects.

FIG. 4: Block Diagram of a UE

FIG. 4 illustrates an example simplified block diagram of a communication device 106, according to some aspects. It is noted that the block diagram of the communication device of FIG. 4 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some aspects, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some aspects, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some aspects, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some aspects, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some aspects (such as when the SIM(s) include an eUICC), one or more of the SIM(s) may implement embedded SIM (eSIM) functionality; in such an aspect, a single one of the SIM(s) may execute multiple SIM applications. Each of the SIMs may include components such as a processor and/or a memory; instructions for performing SIM/eSIM functionality may be stored in the memory and executed by the processor. In some aspects, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some aspects, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some aspects, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain aspects the voice call may be a packet switched communication. In other words, the voice call may be received using voice over LTE (VoLTE) technology and/or voice over NR (VoNR) technology. In some aspects, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some aspects, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some aspects, the MMU 440 may be included as a portion of the processor(s) 402.

As noted above, the communication device 106 may be configured to communicate using wireless and/or wired communication circuitry. The communication device 106 may be configured to perform methods for supporting a periodical RNA mechanism as part of an SDT procedure, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
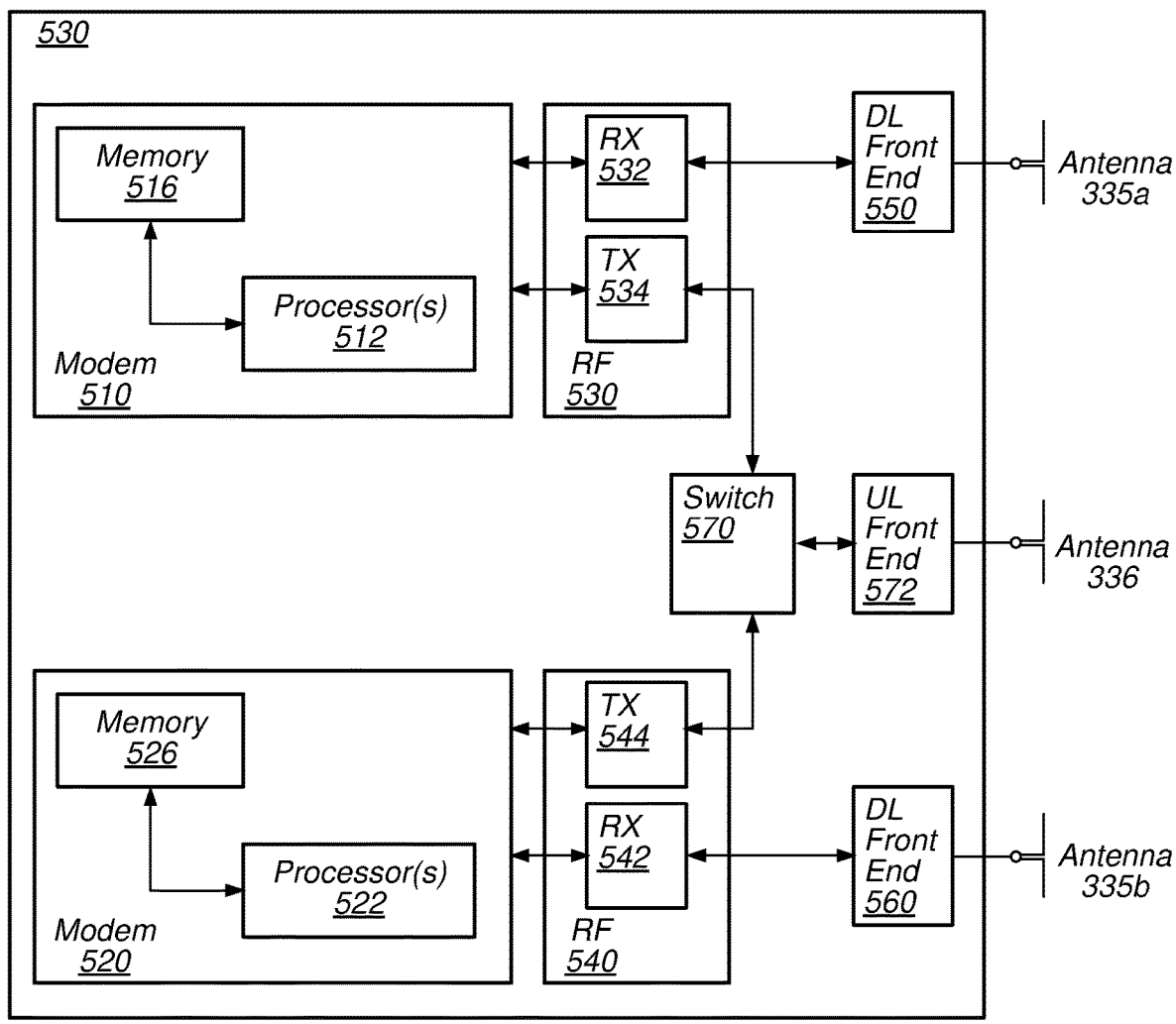
FIG. 5 illustrates an example block diagram of cellular communication circuitry, according to some aspects.

FIG. 5: Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit. According to aspects, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some aspects, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some aspects, the cellular communication circuitry 530 may be configured to perform methods supporting a periodical RNA mechanism as part of an SDT procedure, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
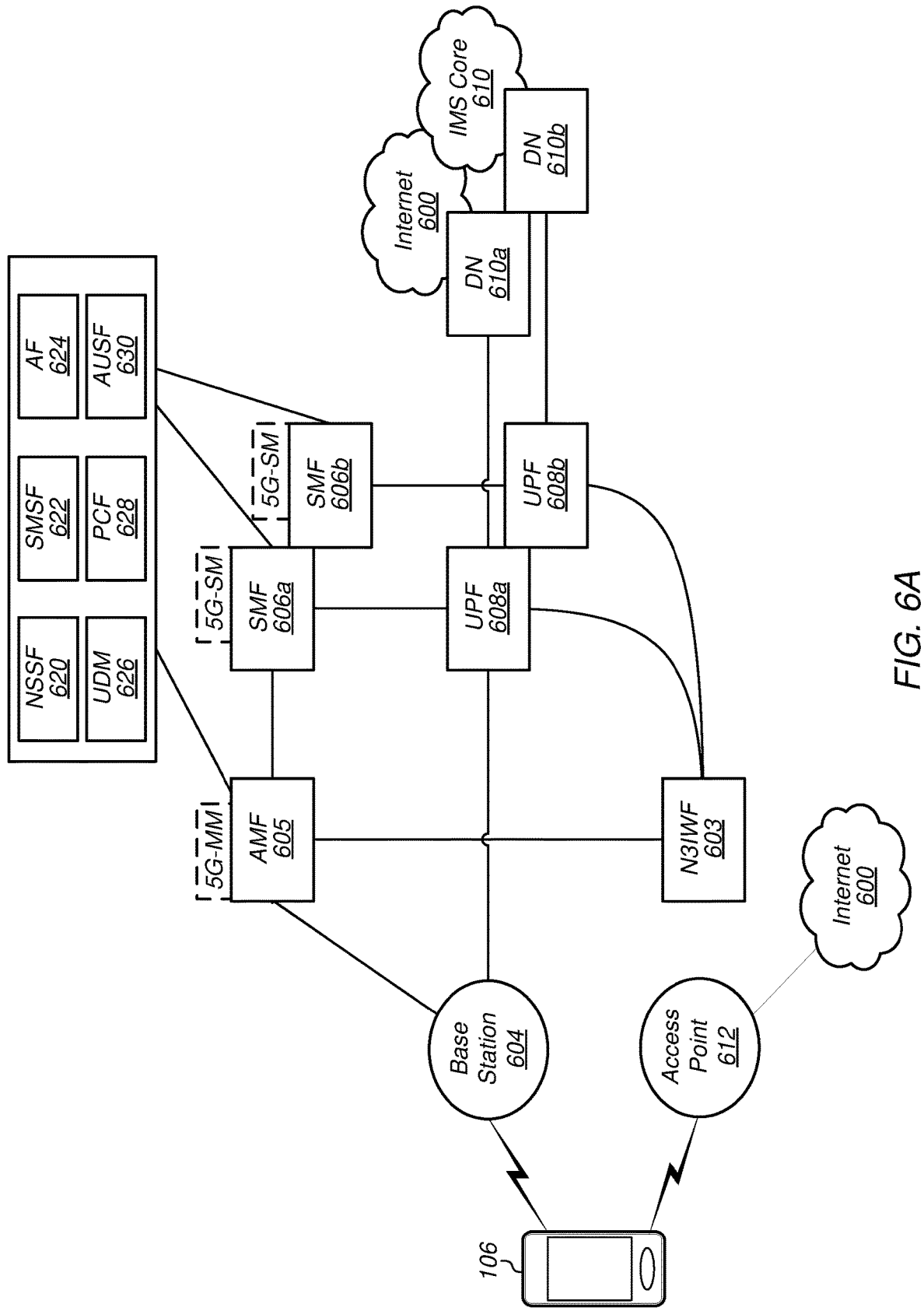
FIG. 6A illustrates an example of a 5G network architecture that incorporates both 3GPP (e.g., cellular) and non-3GPP (e.g., non-cellular) access to the 5G CN, according to some aspects.
Figure 6B:
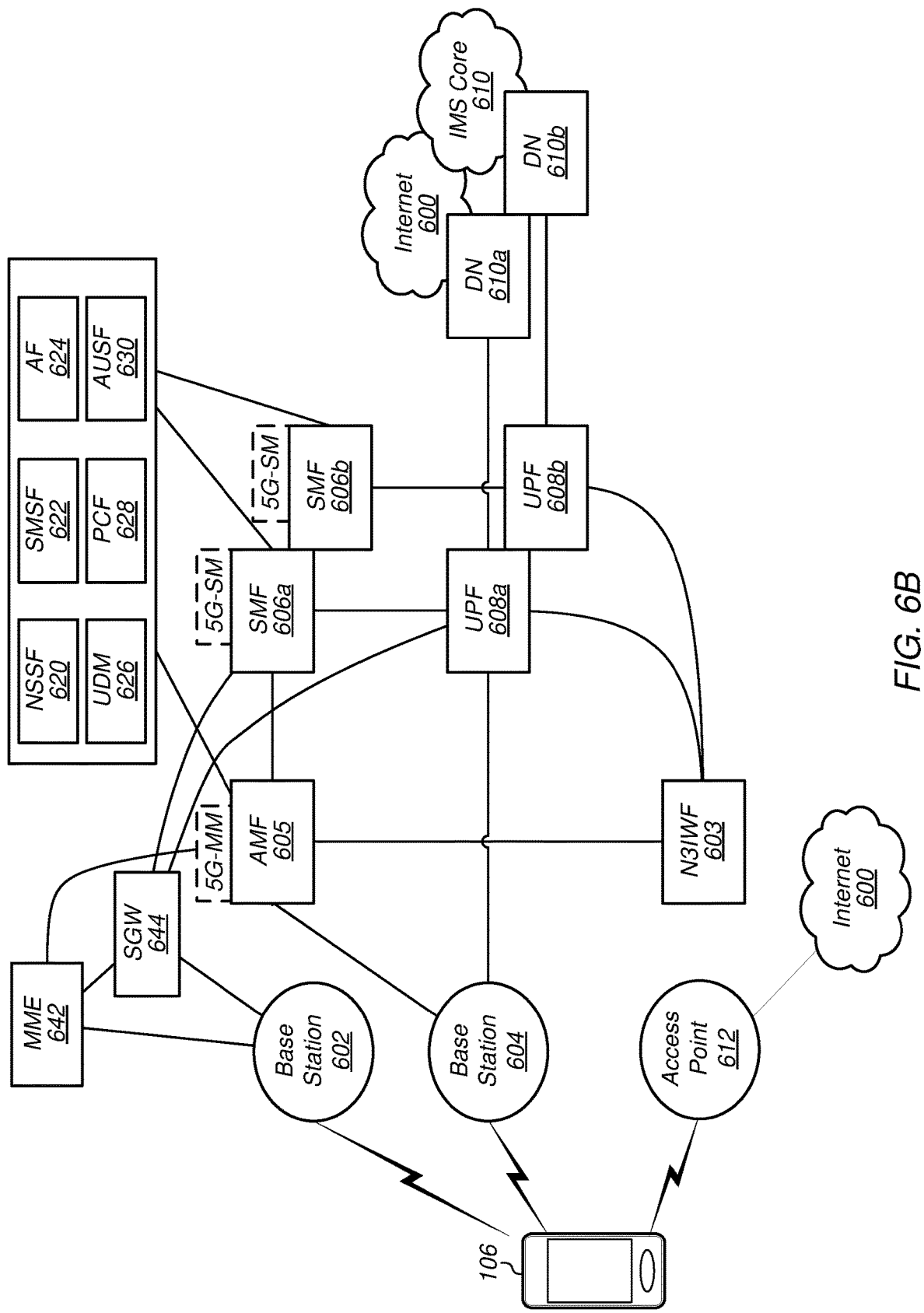
FIG. 6B illustrates an example of a 5G network architecture that incorporates both dual 3GPP (e.g., LTE and 5G NR) access and non-3GPP access to the 5G CN, according to some aspects.
Figure 7:
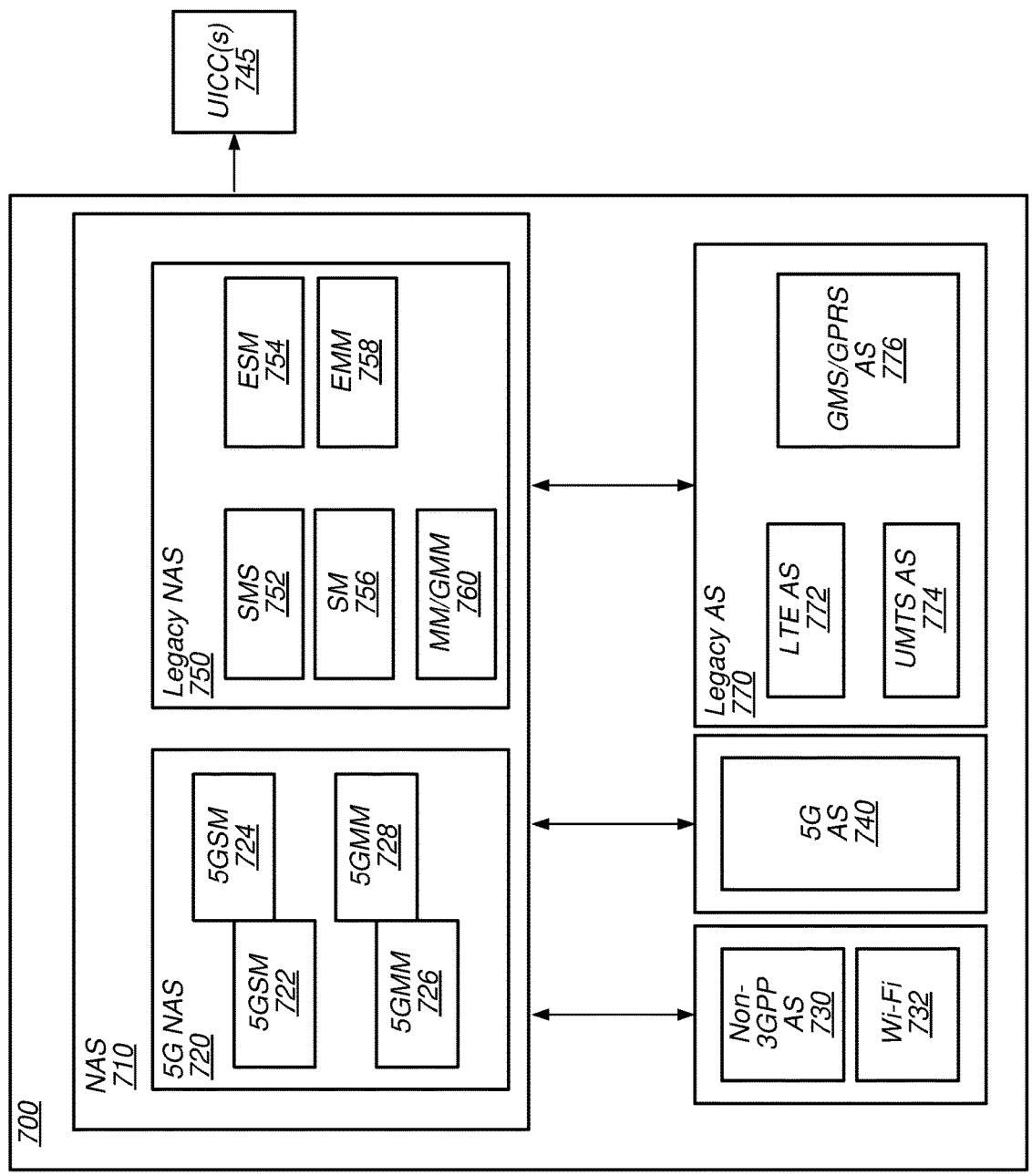
FIG. 7 illustrates an example of a baseband processor architecture for a UE, according to some aspects.

FIGS. 6A, 6B and 7: 5G Core Network Architecture—Interworking with Wi-Fi

In some aspects, the 5G core network (CN) may be accessed via (or through) a cellular connection/interface (e.g., via a 3GPP communication architecture/protocol) and anon-cellular connection/interface (e.g., anon-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some aspects. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some aspects. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606 *a* and the UPF 608 *a*. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606 *a* and the SMF 606 *b* of the 5G CN. The AMF 605 may be connected to (or in communication with) the SMF 606 *a*. Further, the gNB 604 may in communication with (or connected to) the UPF 608 *a* that may also be communication with the SMF 606 *a*. Similarly, the N3IWF 603 may be communicating with a UPF 608 *b* that may also be communicating with the SMF 606 *b*. Both UPFs may be communicating with the data network (e.g., DN 610 *a* and 610 *b*) and/or the Internet 600 and IMS core network 610.

Note that in various aspects, one or more of the above-described network entities may be configured to perform methods to improve security checks in a 5G NR network, including mechanisms supporting a periodical RNA mechanism as part of an SDT procedure, e.g., in 5G NR systems and beyond, e.g., as further described herein.

FIG. 7 illustrates an example of a baseband processor architecture for a UE (e.g., such as UE 106), according to some aspects. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various aspects, one or more of the above-described functional entities of the 5G NAS and/or 5G AS may be configured to perform methods supporting a periodical RNA mechanism as part of an SDT procedure, e.g., in 5G NR systems and beyond, e.g., as further described herein.

RNA Updating Mechanism During an SDT Procedure

In some current implementations of cellular communication networks, transmission of data packets, for example small data transmissions (SDTs), may require an established radio resource control (RRC) connection between a wireless device, such as a UE, and a base station. Thus, while in an RRC inactive state, the UE may, in a control plane, have a network access stratum (NAS) connection to the core network (CN), but may have no dedicated access stratum (AS) resource for an RRC connection. Further, in a user plane, the UE may not perform any dedicated transmission and/or reception. Thus, if the UE has a dedicated transmission and/or reception, the UE may be required to enter an RRC connected (RRC_CONNECTED) state. As an example, for a downlink (DL) data transmission, the base station may page the UE via a radio access network (RAN) paging mechanism to trigger the UE to enter an RRC connected state. Similarly, for an uplink (UL) transmission, the UE may trigger a random-access channel (RACH) procedure to enter an RRC connected state. Additionally, the UE, while in the RRC inactive state, may move within a RAN notification area (RNA) without notifying the RAN.

Note that when a UE transitions from an RRC connected state to an RRC inactive state, the UE may send an RRC release with suspend information message to the base station. Further, when the UE transitions from an RRC inactive state to an RRC connected state, the UE may perform an RRC resume procedure with the base station. Finally, when the UE transitions from an RRC inactive state to an RRC idle state, the UE may send an RRC release message. This may also occur if and/or when a UE cannot find a cell for camping.

In 3GPP Release 15, an RNA update procedure may be triggered when a UE moves out of a configured RNA and/or periodically (e.g., controlled by timer T380). The periodical RN update, controlled by timer T380, may be configured by the network. For example, the network may configure the T380 timer when the network provides an RRC release with suspend message to the UE. Upon receiving the configuration, the UE may start (or initiate) the T380 timer. Further, upon initiating an RRC resume procedure, the UE may stop the T380 timer. Note that the UE may provide periodic RNA updates upon expiration of the T380 timer, as well.

Figure 8A:
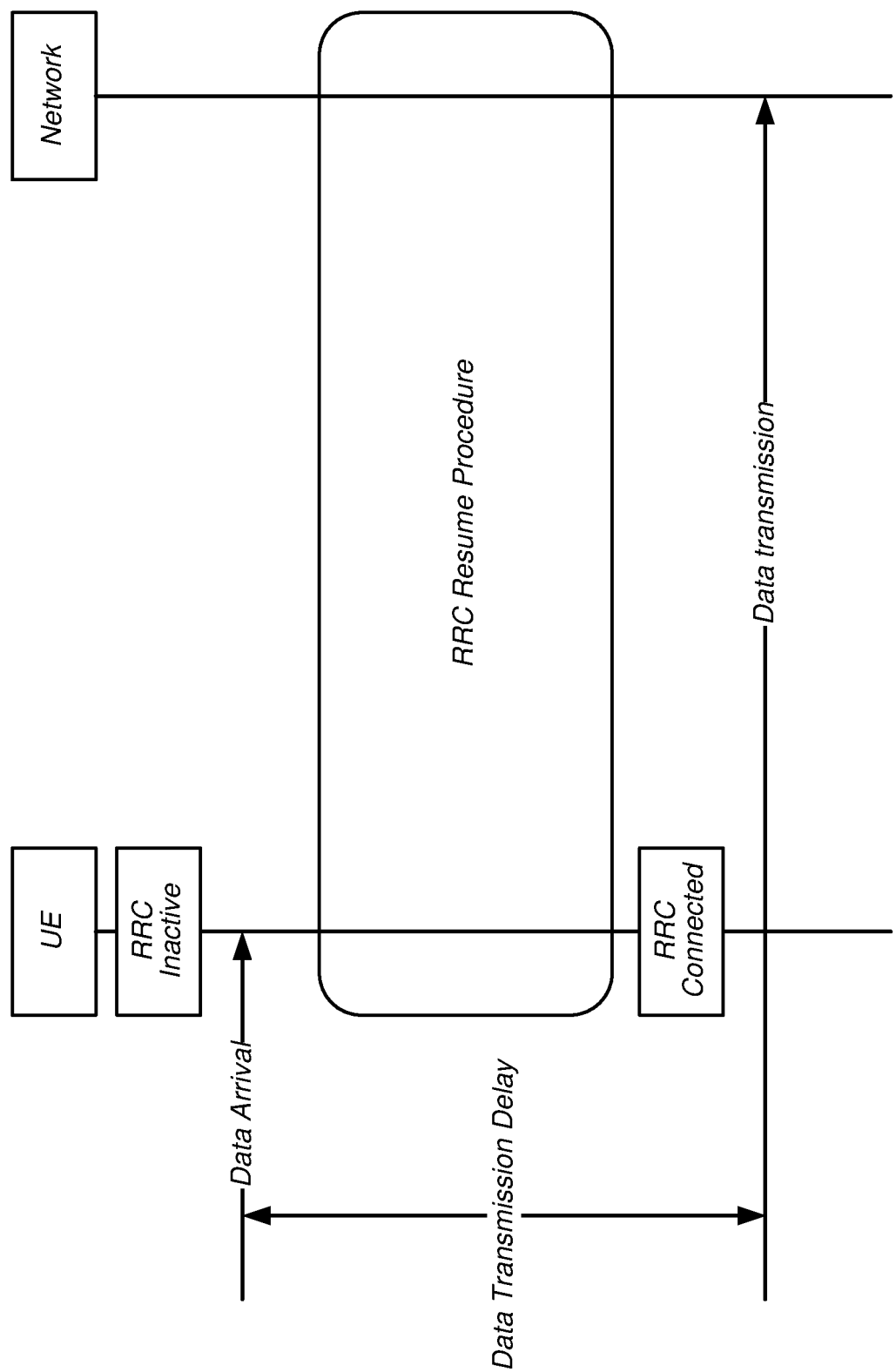
FIG. 8A illustrates an example of a delay for small data transmissions when a UE is required to perform an RRC resume procedure.

Further, as illustrated by FIG. 8A, some current implementations (e.g., pre 3GPP Release 17 implementations) may require a UE in an RRC inactive state to perform an RRC resume connection procedure upon detection of data arrival for transmission to the network. As can be seen from FIG. 8A, such a procedure causes a delay for data transmission as well resource consumption at the UE to perform the RRC resume connection procedure.

Figure 8B:
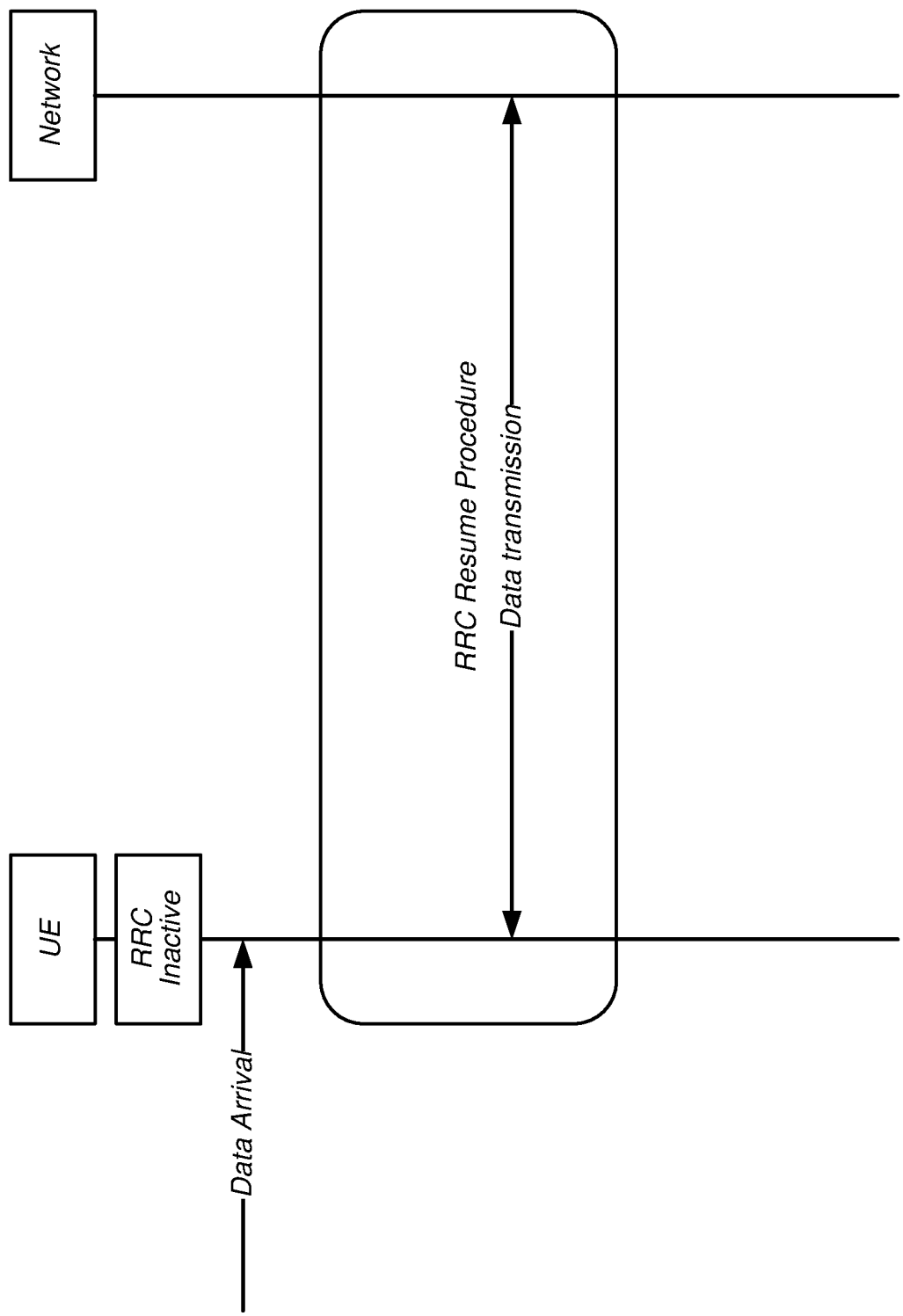
FIG. 8B illustrates an example of a small data transmission when a UE is not required to perform an RRC resume procedure.

To address the above issues, implementations of 3GPP Release 17 may include support for small data transmission (SDT) while a UE is in an RRC inactive state, e.g., without transitioning to an RRC connected state. For example, as illustrated by FIG. 8B, a UE in an RRC inactive state may perform data transmission/reception upon detection of data arrival for transmission to the network without performing an RRC resume connection procedure. As can be seen from FIG. 8B, such a procedure reduces the delay for data transmission as well as reducing resource consumption at the UE, e.g., as compared to the procedure described in FIG. 8A.

Note that for both RACH and cell group (CG) based solutions, implementations may require that upon initiating a resume procedure for SDT initiation (e.g., for a first SDT transmission), the UE is required to re-establish at least SDT packet data convergence protocol (PDCP) entities and resume SDT data radio bearers (DRBs) that are configured for SDT as well as signaling radio bearer 1 (SRB1). As can be seen from FIG. 8B, UE operation for SDT DRB is clear in the case of UL data arrival. In particular, the UE may reestablish the PDCP entity, apply a newly derived security key, resume transmission, and trigger the SDT procedure. In some instances, a buffer status report (BSR) MAC CE may reflect a data amount of the SDT DRB. Regarding the periodical RNA update, timer based periodical RNA updates remain applicable for RRC resume procedures, however, usage of the periodical RNA update during an SDT procedure is unclear. In other words, it is unclear whether the periodical RNA update procedure can be applicable to an SDT procedure as well as how to apply the T380 timer to the SDT procedure.

Aspects described herein provide systems, methods, and mechanisms for supporting a periodical RNA mechanism as part of an SDT procedure. In some aspects, the network may configure an RNA timer and enable an SDT feature in an RRC release with suspend message when a UE, such as UE 106, enters an RRC inactive state. In some aspects, the network may reconfigure an RNA timer during an SDT procedure, e.g., via RRC and/or MAC signaling.

As an example, a periodical RNA update mechanism during an SDT procedure may include a UE, such as UE 106, entering an RRC inactive state upon receiving a timer configuration from the network. The UE may also start the timer. Then, when the UE initiates an SDT procedure, the UE may stop the timer. Note that during the SDT procedure, the UE may not start the timer (e.g., the time is not running during the SDT procedure). Upon completion of the SDT procedure (e.g., upon termination of the SDT procedure) the UE may start the timer. Then, upon expiration of the timer (e.g., timer expiry), the UE may trigger an RRC resume procedure and/or trigger an SDT procedure. In some aspects, the UE may always trigger the RRC resume procedure upon expiration of the timer, may always trigger the SDT procedure upon expiration of the timer, or may determine which procedure to trigger based, at least in part, on whether a cell group (CG) based SDT procedure is configured, on which RACH resource for the transmission is nearest, and/or based on one or more other UE dependent factors.

In some aspects, if and/or when the network cannot receive either the SDT or RRC resume procedure within a period (according to the RNA timer), the network may regard the UE as not in an RRC inactive state and may release the UE into an RRC idle state.

In some aspects, an RNA timer may be configured by a network via an RRC release message, an SDT termination message, an SDT subsequent transmission indication, and/or an SDT subsequent transmission termination indication. For example, FIG. 9A illustrates an example of a UE receiving a timer configuration in an RRC release message, according to some aspects. As shown, a UE, such as UE 106, may be operating in an RRC connected state. The UE may receive, from a base station, such as base station 102, an RRC release message 912 with a suspend configuration. The RRC release message 912 may instruct the UE to transition to an RRC inactive state. The RRC release message 912 may include an indication that SDT is enabled for the UE. Further, the RRC release message 912 may include a configuration (and/or an indication of a configuration) for an RNA timer, e.g., such as duration and/or value of the timer. Thus, upon receipt of the RRC release message 912, the UE may transition to an RRC inactive state and initiate the RNA timer.

Figure 9B:
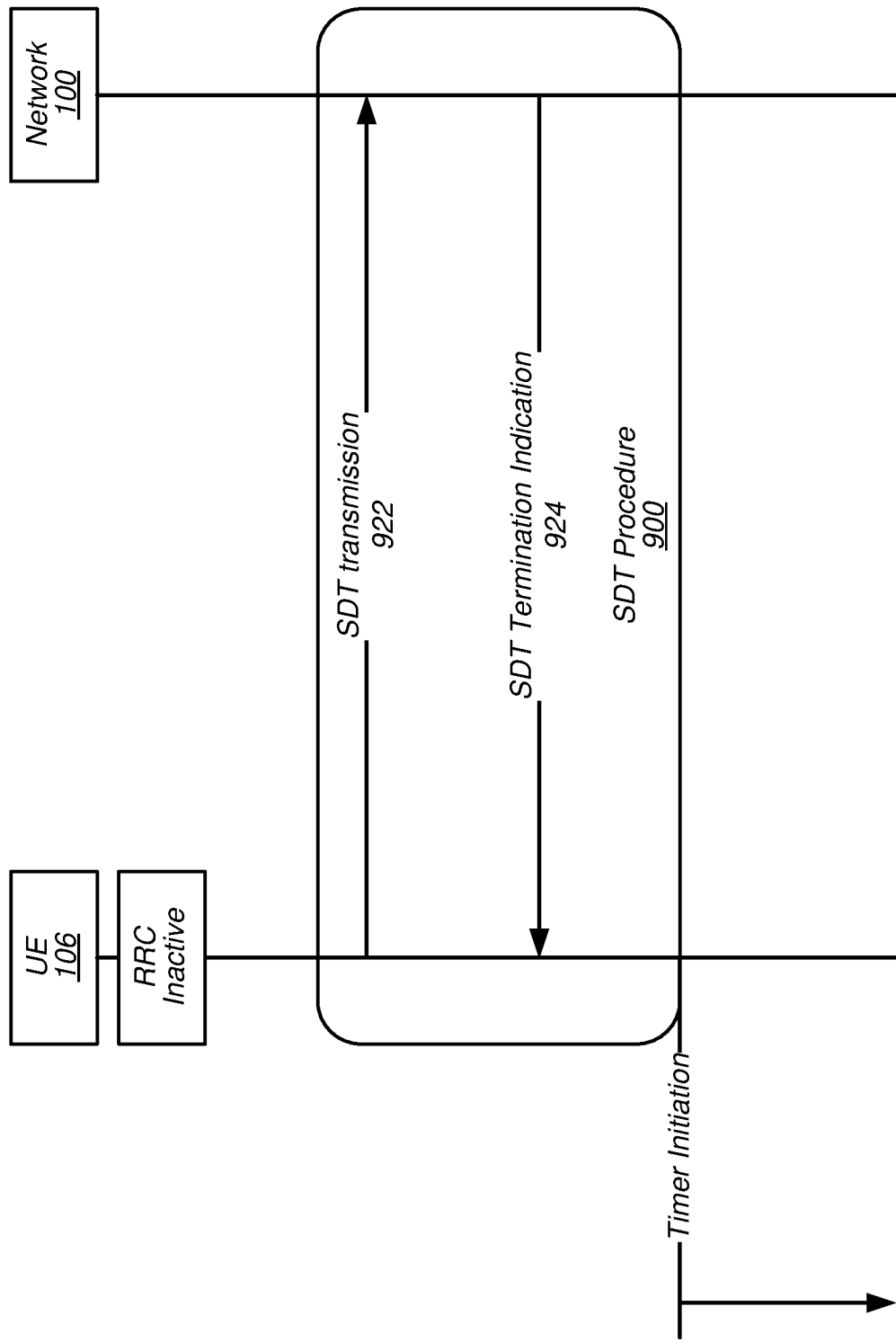
FIG. 9B illustrates an example of a UE receiving a timer configuration in an SDT termination message, according to some aspects.

As another example, FIG. 9B illustrates an example of a UE receiving a timer configuration in an SDT termination message, according to some aspects. As shown, a UE, such as UE 106, may be operating in an RRC inactive state, e.g., with SDT enabled. The UE may transmit, to a base station, such as base station 102, an SDT transmission 922 and received, from the base station, an SDT termination indication 924, e.g., during an SDT procedure 900. The SDT termination indication 924 may include a configuration (and/or an indication of a configuration) for an RNA timer, e.g., such as duration and/or value of the timer. Thus, upon receipt of the SDT termination indication 924, the UE may terminate the SDT procedure 900 and initiate the RNA timer.

Figure 9C:
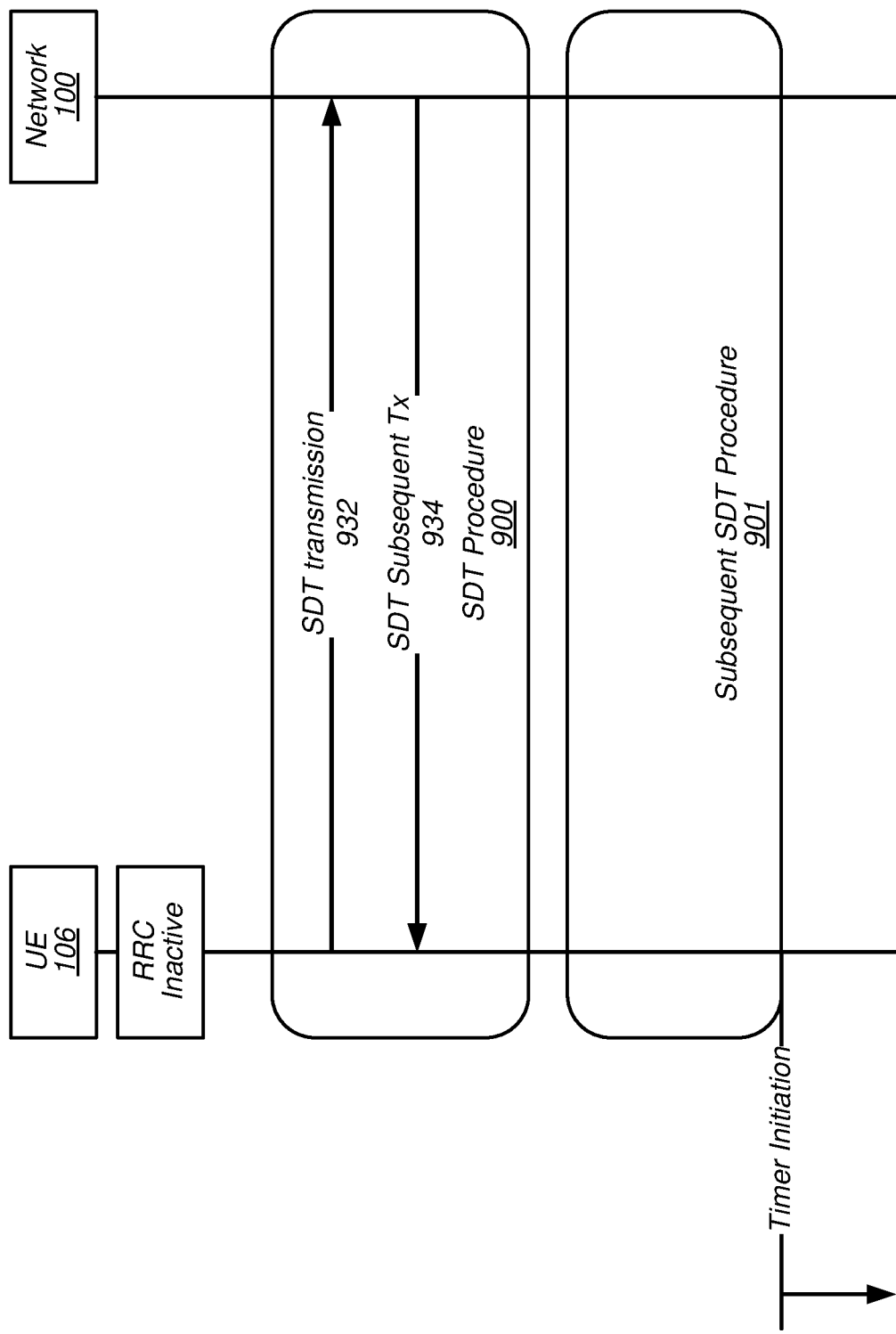
FIG. 9C illustrates an example of a UE receiving a timer configuration in an SDT subsequent transmission indication, according to some aspects.

As a further example, FIG. 9C illustrates an example of a UE receiving a timer configuration in an SDT subsequent transmission indication, according to some aspects. As shown, a UE, such as UE 106, may be operating in an RRC inactive state, e.g., with SDT enabled. The UE may transmit, to a base station, such as base station 102, an SDT transmission 932 and received, from the base station, an SDT subsequent transmission indication 934, e.g., during an SDT procedure 900. The SDT subsequent transmission indication 934 may indicate that the UE continue the SDT procedure in a subsequent transmission period (e.g., such as subsequent SDT procedure 901. In addition, SDT subsequent transmission indication 934 may include a configuration (and/or an indication of a configuration) for an RNA timer, e.g., such as duration and/or value of the timer. Thus, upon receipt of the SDT subsequent transmission indication 934, the UE may continue with the SDT procedure in the subsequent transmission period and then terminate the SDT procedure. Upon exiting the SDT procedure, the UE may initiate the RNA timer.

Figure 9D:
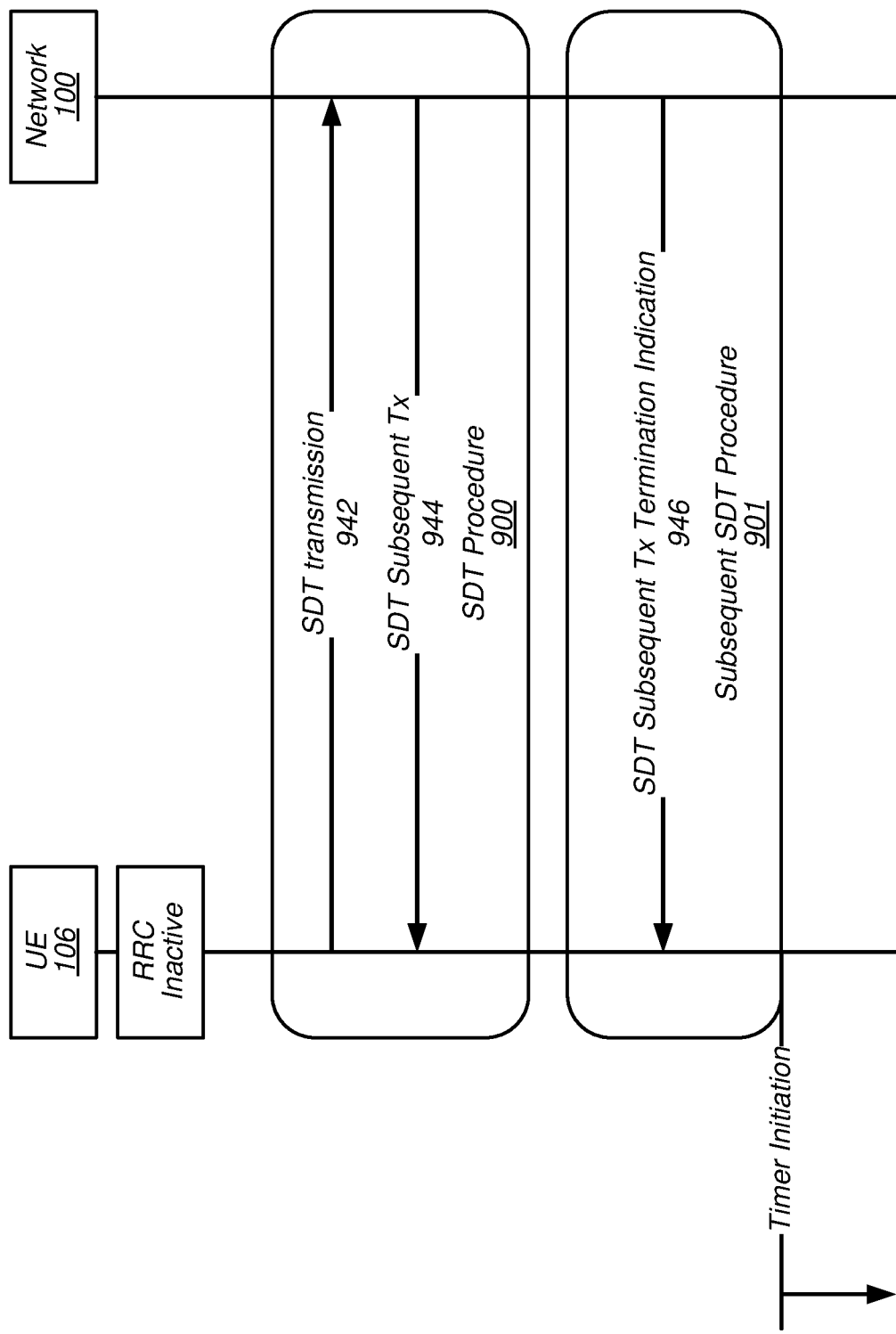
FIG. 9D illustrates an example of a UE receiving a timer configuration in an SDT subsequent transmission termination indication, according to some aspects.

As yet a further example, FIG. 9D illustrates an example of a UE receiving a timer configuration in an SDT subsequent transmission termination indication, according to some aspects. As shown, a UE, such as UE 106, may be operating in an RRC inactive state, e.g., with SDT enabled. The UE may transmit, to a base station, such as base station 102, an SDT transmission 942 and received, from the base station, an SDT subsequent transmission indication 944, e.g., during an SDT procedure 900. The SDT subsequent transmission indication 944 may indicate that the UE continue the SDT procedure in a subsequent transmission period (e.g., such as subsequent SDT procedure 901. In addition, SDT subsequent transmission indication 944 may include a configuration (and/or an indication of a configuration) for an RNA timer, e.g., such as duration and/or value of the timer. Thus, upon receipt of the SDT subsequent transmission indication 944, the UE may continue with the SDT procedure in the subsequent transmission period. The UE may receive, from the base station and during the subsequent transmission period, an SDT subsequent transmission (Tx) termination indication 946. The SDT subsequent transmission (Tx) termination indication 946 may include a configuration (and/or an indication of a configuration) for an RNA timer, e.g., such as duration and/or value of the timer. Note that the configuration included in SDT subsequent Tx termination indication 944 may be an updated configuration if and/or when SDT subsequent transmission indication 944 included a configuration for the RNA. Thus, upon receipt of the SDT subsequent Tx termination indication 944, the UE may terminate the SDT procedure. Upon exiting the SDT procedure, the UE may initiate the RNA timer, e.g., based on the configuration of the RNA timer included in SDT subsequent Tx termination indication 944.

Figure 10:
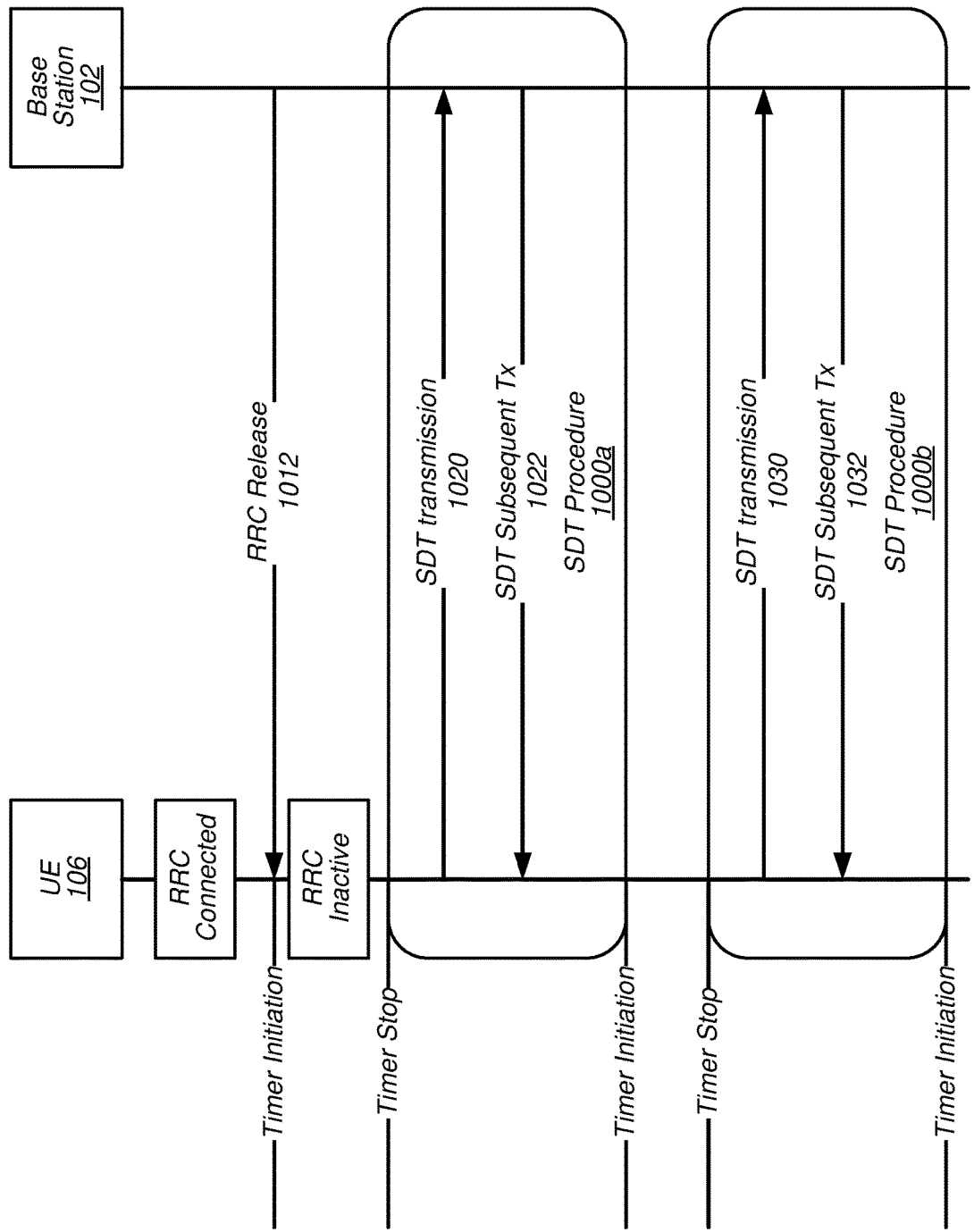
FIG. 10 illustrates an example of a UE managing an RNA timer with entering and exiting SDT procedures, according to some aspects.

In some aspects, an RNA timer may be stopped while entering an SDT procedure and then restarted when exiting an SDT procedure, e.g., without expiration of the timer. For example, FIG. 10 illustrates an example of a UE managing an RNA timer with entering and exiting SDT procedures, according to some aspects. As shown, a UE, such as UE 106, may be operating in an RRC connected state. The UE may receive, from a base station, such as base station 102, an RRC release message 1012 with a suspend configuration. The RRC release message 1012 may instruct the UE to transition to an RRC inactive state. The RRC release message 1012 may include an indication that SDT is enabled for the UE. Further, the RRC release message 1012 may include a configuration (and/or an indication of a configuration) for an RNA timer, e.g., such as duration and/or value of the timer. Thus, upon receipt of the RRC release message 1012, the UE may transition to an RRC inactive state and initiate the RNA timer. Then, the UE may detect arrival of SDT data and initiate an SDT procedure 1000a. Upon initiation of the procedure, the UE may stop the RNA timer. During the SDT procedure 1000a, the UE may transmit an SDT transmission 1020 and receive an SDT subsequent transmission indication 1022. The SDT subsequent transmission indication 1022 may include an updated configuration (and/or an indication of an updated configuration) for the RNA timer, e.g., such as duration and/or value of the timer. Note that the updated configuration may be equivalent to the configuration. Then, upon exiting the SDT procedure 1000a, the UE may start the RNA time, e.g., based on the updated configuration. Further, upon entering SDT procedure 1000b, which may be a subsequent transmission period of SDT procedure 1000a, the UE may stop the RNA timer. During the SDT procedure 1000b, the UE may transmit an SDT transmission 1030 and receive an SDT subsequent transmission indication 1032. The SDT subsequent transmission indication 1032 may include an updated configuration (and/or an indication of an updated configuration) for the RNA timer, e.g., such as duration and/or value of the timer. Note that the updated configuration may be equivalent to the configuration or the updated configuration included in SDT subsequent transmission indication 1022. Then, upon exiting the SDT procedure 1000b, the UE may start the RNA time, e.g., based on the updated configuration.

Figure 11:
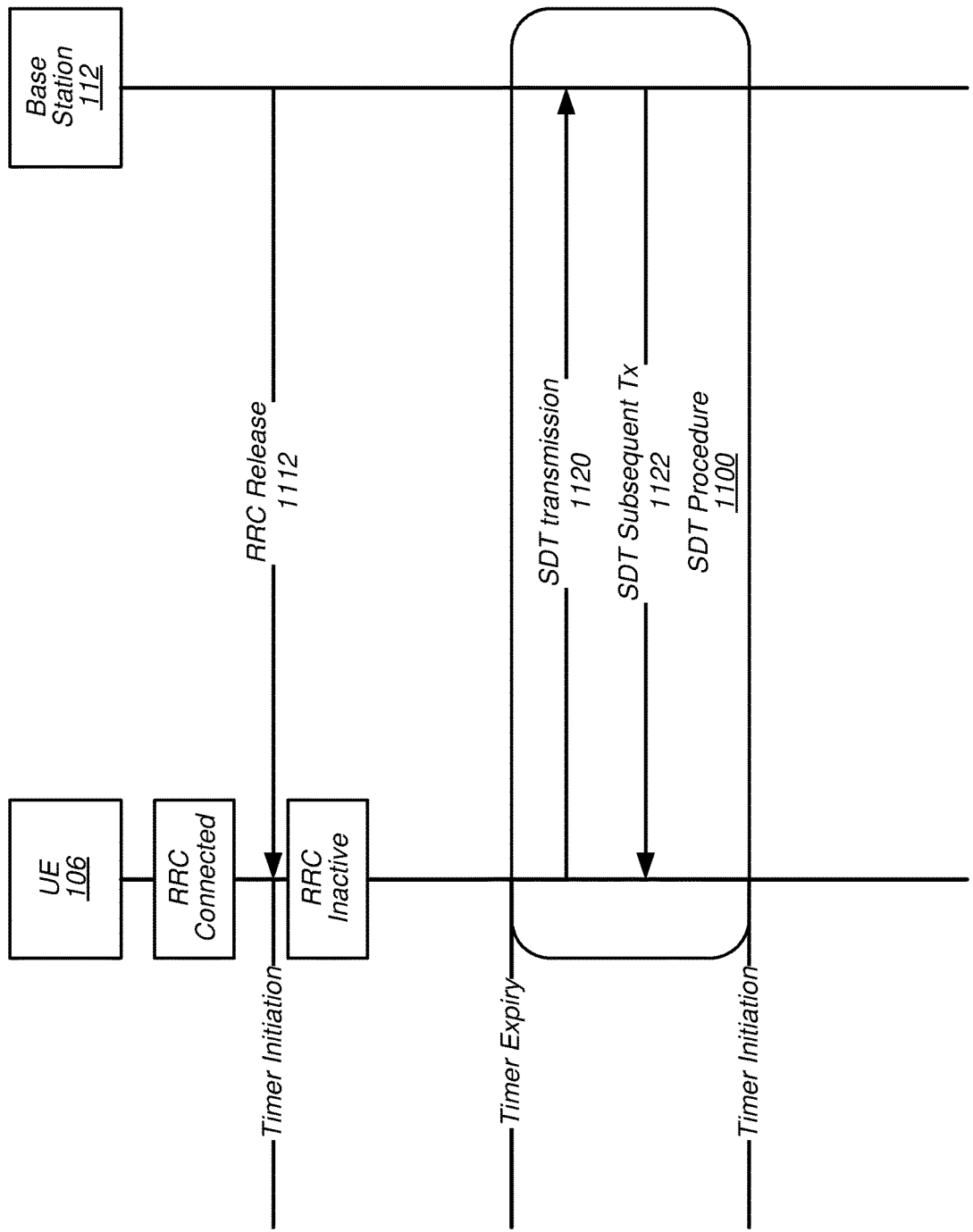
FIG. 11 illustrates another example of a UE managing an RNA timer while entering and exiting SDT procedures, according to some aspects.

As another example, FIG. 11 illustrates another example of a UE managing an RNA timer while entering and exiting SDT procedures, according to some aspects. As shown, a UE, such as UE 106, may be operating in an RRC connected state. The UE may receive, from a base station, such as base station 102, an RRC release message 1112 with a suspend configuration. The RRC release message 1112 may instruct the UE to transition to an RRC inactive state. The RRC release message 1112 may include an indication that SDT is enabled for the UE. Further, the RRC release message 1112 may include a configuration (and/or an indication of a configuration) for an RNA timer, e.g., such as duration and/or value of the timer. Thus, upon receipt of the RRC release message 1112, the UE may transition to an RRC inactive state and initiate the RNA timer. Then, upon expiration of the timer, the UE initiate an SDT procedure 1100, e.g., to update RNA. During the SDT procedure 1100, the UE may transmit an SDT transmission 1120 and receive an SDT subsequent transmission indication 1122. The SDT subsequent transmission indication 1122 may include an updated configuration (and/or an indication of an updated configuration) for the RNA timer, e.g., such as duration and/or value of the timer. Note that the updated configuration may be equivalent to the configuration. Then, upon exiting the SDT procedure 1100, the UE may start the RNA time, e.g., based on the updated configuration.

Figure 12:
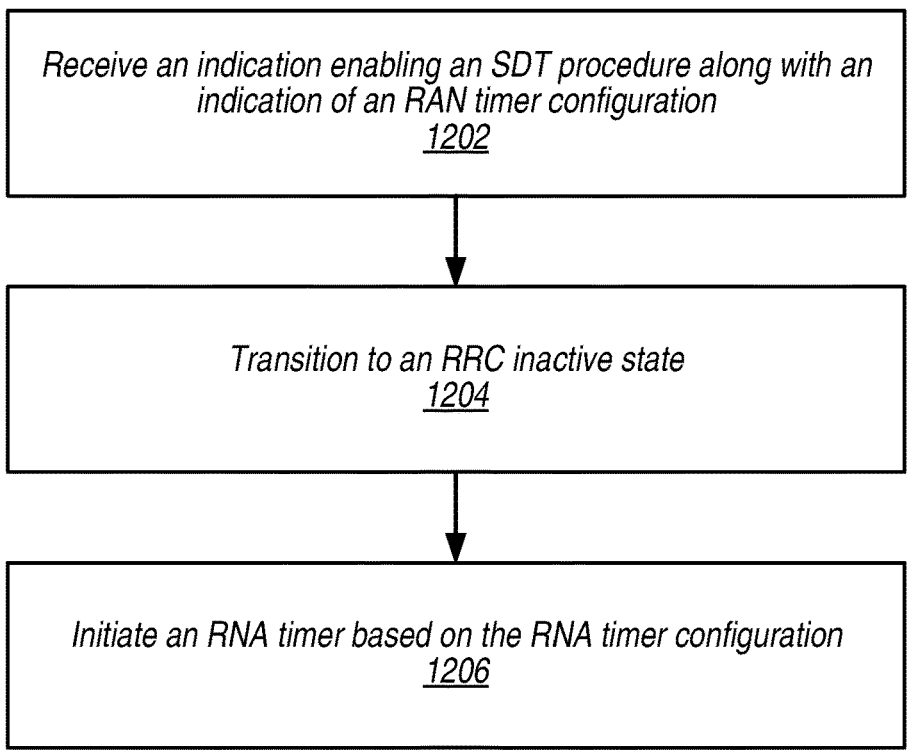
FIG. 12 illustrates a block diagram of an example of a method for supporting a periodical radio access network (RAN) notification area (RNA) mechanism when small data transmission (SDT) is enabled for a UE, according to some aspects.

FIG. 12 illustrates a block diagram of an example of a method for supporting a periodical radio access network (RAN) notification area (RNA) mechanism when small data transmission (SDT) is enabled for a UE, according to some aspects. The method shown in FIG. 12 may be used in conjunction with any of the systems, methods, or devices shown in the Figures, among other devices. In various aspects, some of the method elements shown may be performed concurrently, in a different order than shown, or may be omitted. Additional method elements may also be performed as desired. As shown, this method may operate as follows.

At 1202, a UE, such as UE 106, may receive, from a base station, such as base station 102, an indication enabling an SDT procedure along with an indication of an RNA timer configuration. The RNA timer configuration may include a duration or value of the RNA timer.

At 1204, the UE may transition to a radio resource control (RRC) inactive state.

At 1206, the UE may initiate an RNA timer based on the RNA timer configuration.

In some aspects, upon initiation of the SDT procedure, the UE may stop the RNA timer. Additionally, upon termination of the SDT procedure, the UE may start (and/or restart) the RNA timer. In some aspects, the UE may receive, during the SDT procedure, an SDT termination indication. The SDT termination indication may include an updated RNA timer configuration. In such aspects, the UE starting (and/or restarting) the RNA timer may include the UE starting the RNA timer based on the updated RNA timer configuration. In some aspects, the UE may receive, during the SDT procedure, an SDT subsequent transmission indication. The SDT subsequent transmission indication may include an updated RNA timer configuration. The SDT procedure may be terminated after a subsequent transmission period of the SDT procedure. In such aspects, the UE starting (and/or restarting) the RNA timer may include the UE starting the RNA timer based on the updated RNA timer configuration. In some aspects, the UE may receive, during a subsequent transmission period of the SDT procedure, an SDT subsequent transmission termination indication. The SDT subsequent transmission termination indication may include an updated RNA timer configuration. The SDT procedure may be terminated after a subsequent transmission period of the SDT procedure. In such aspects, the UE starting (and/or restarting) the RNA timer may include the UE starting the RNA timer based on the updated RNA timer configuration.

In some aspects, the UE may detect expiration of the RNA timer and trigger, based on at least one condition, at least one of an RRC resume procedure or an SDT procedure to provide an RNA update. The at least one condition may include whether a cell group based SDT procedure is configured, which random access channel (RACH) resource for a transmission is nearest, and/or one or more UE specific factors. In some aspects, when a cell group based SDT procedure is configured, the UE may trigger the SDT procedure to provide the RNA update. In some aspects, when the cell group based SDT procedure is not configured, the UE may trigger the RRC resume procedure to provide the RNA update. In some aspects, the one or more UE specific factors may include any, any combination of, and/or all of (e.g., at least one of and/or one or more of) UE device type, UE mobility state, and/or UE power state. For example, if the UE is a power saving UE (e.g., the UE device type and/or power state indicates a power savings mode and/or state), the UE may prioritize the SDT procedure for the RNA update procedure. As another example, if the UE is in a low power mode (e.g., due to depleted battery level), the UE may prioritize the SDT procedure for the RNA update procedure. In some aspects, when a configured grant based SDT is configured and the SDT specific CG is valid, the UE may trigger the RNA via the SDT procedure, e.g., via the SDT specific CG resource.

In some aspects, the UE may receive, during an SDT procedure, an updated RNA timer configuration. The updated RNA timer configuration may be received via one of RRC signaling or medium access control (MAC) signaling.

Figure 13:
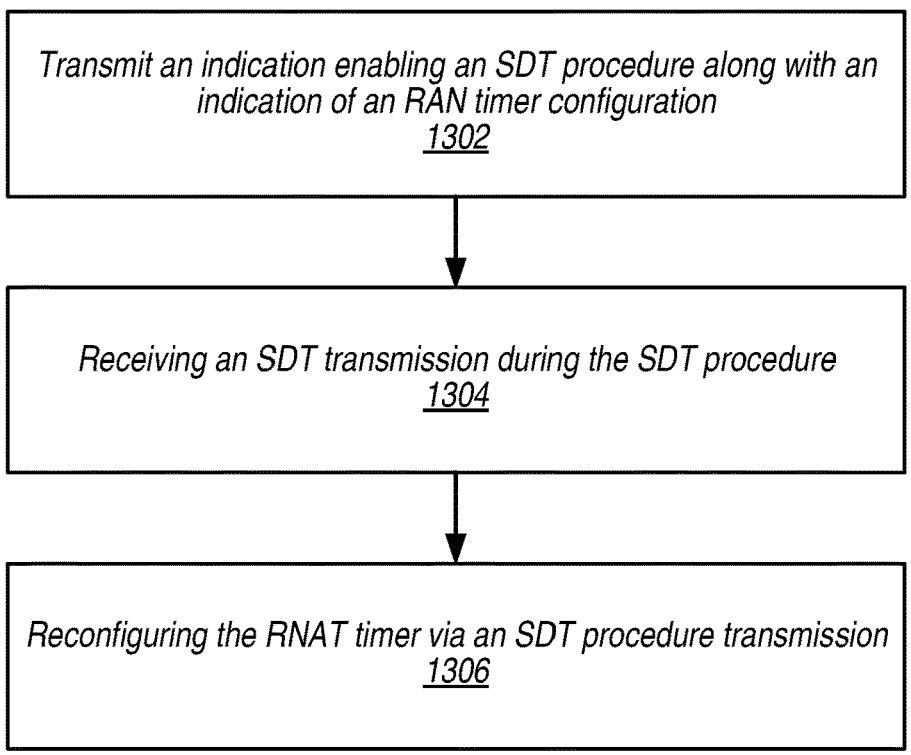
FIG. 13 illustrates a block diagram of another example of a method for supporting a periodical radio access network (RAN) notification area (RNA) mechanism when small data transmission (SDT) is enabled for a UE, according to some aspects.

FIG. 13 illustrates a block diagram of another example of a method for supporting a periodical radio access network (RAN) notification area (RNA) mechanism when small data transmission (SDT) is enabled for a UE, according to some aspects. The method shown in FIG. 12 may be used in conjunction with any of the systems, methods, or devices shown in the Figures, among other devices. In various aspects, some of the method elements shown may be performed concurrently, in a different order than shown, or may be omitted. Additional method elements may also be performed as desired. As shown, this method may operate as follows.

At 1302, a base station, such as bast station 102 may transmit, to a UE, such as UE 106, an indication enabling an SDT procedure along with an indication of an RNA timer configuration. In some aspects, the RNA timer configuration may include a duration or value of the RNA timer.

At 1304, the base station may receive, from the UE, an SDT transmission during the SDT procedure.

At 1306, the base station may reconfigure the RNA timer via an SDT procedure transmission to the UE, e.g., provide an updated RNA timer configuration. In some aspects, the SDT procedure transmission may include any, any combination of, and/or all of (e.g., at least one of and/or one or more of) an SDT termination indication, an SDT subsequent transmission indication, and/or an SDT subsequent transmission termination indication. In some aspects, the updated RNA timer configuration may be transmitted via RRC signaling and/or via medium access control (MAC) signaling.

In some aspects, the base station may receive, upon expiration of the RNA timer, an RNA update from the UE via one of an RRC resume procedure or an SDT procedure. In some aspects, when a cell group based SDT procedure is configured, the RNA update may be provided via the SDT procedure. In some aspects, when a configured grant based SDT procedure is configured, the RNA update may be provided via the SDT procedure. In some aspects, when the cell group based SDT procedure is not configured, the RNA update may be provided via the RRC resume procedure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of the method aspects described herein, or, any combination of the method aspects described herein, or, any subset of any of the method aspects described herein, or, any combination of such subsets.

In some aspects, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a user equipment device (UE), comprising:
receiving, from a base station, an indication enabling a small data transmission (SDT) procedure along with an indication of a radio access network (RAN) notification area (RNA) timer configuration, wherein the RNA is stopped upon initiation of the SDT procedure and started upon termination of the SDT procedure;
transitioning to a radio resource control (RRC) inactive state;
receiving, during the SDT procedure, an updated RNA timer configuration in at least one of an SDT termination indication or an SDT subsequent transmission indication; and
initiating an RNA timer based on the updated RNA timer configuration; and
wherein the SDT procedure is terminated after a subsequent transmission period of the SDT procedure.

2. The method of claim 1, further comprising:
receiving, during a subsequent transmission period of the SDT procedure, an SDT subsequent transmission termination indication, wherein the SDT subsequent transmission termination indication includes an updated RNA timer configuration, and wherein the SDT procedure is terminated after a subsequent transmission period of the SDT procedure.

3. The method of claim 1, further comprising:
detecting expiration of the RNA timer; and
triggering, in response to detecting expiration of the RNA timer, an RRC resume procedure.

4. The method of claim 1,
wherein the updated RNA timer configuration is received via RRC signaling.

5. The method of claim 1,
wherein the RNA timer configuration includes a duration or value of the RNA timer.

6. The method of claim 1,
wherein the updated RNA timer configuration is received via medium access control signaling.

7. A method for supporting a periodical radio access network (RAN) notification area (RNA) mechanism, comprising:
transmitting, to a user equipment device (UE), an indication enabling a small data transmission (SDT) procedure along with an indication of an RNA timer configuration;
receiving, from the UE, an SDT transmission during the SDT procedure;
reconfiguring the RNA timer via an SDT procedure transmission to the UE; and
receiving, upon expiration of the RNA timer, an RNA update from the UE via one of an RRC resume procedure or an SDT procedure, wherein, when a cell group based SDT procedure is configured or when a configured grant based SDT procedure is configured, the RNA update is provided via the SDT procedure, and wherein, when the cell group based SDT procedure is not configured, the RNA update is provided via the RRC resume procedure.

8. The method of claim 7,
wherein SDT procedure transmission includes at least one of an SDT termination indication, an SDT subsequent transmission indication, or an SDT subsequent transmission termination indication.

9. The method of claim 7,
wherein the RNA timer configuration is transmitted via radio resource control (RRC) signaling as part of the SDT procedure transmission.

10. The method of claim 7,
wherein the RNA timer configuration is transmitted via medium access control (MAC) signaling as part of the SDT procedure transmission.

11. The method of claim 7,
wherein the RNA timer configuration includes a duration or value of the RNA timer.

12. The method of claim 7, further comprising:
transmitting, during a subsequent transmission period of the SDT procedure, an SDT subsequent transmission termination indication.

13. The method of claim 12,
wherein the SDT subsequent transmission termination indication includes an updated RNA timer configuration.

14. The method of claim 13,
wherein the SDT procedure is terminated after a subsequent transmission period of the SDT procedure.

15. A user equipment device (UE), comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to communications;
wherein the one or more processors are configured to cause the UE to:
receive, from a base station, an indication enabling an SDT procedure along with an indication of an RNA timer configuration, wherein the RNA is stopped upon initiation of the SDT procedure and started upon termination of the SDT procedure;
transition to a radio resource control (RRC) inactive state;
receive, during the SDT procedure, an updated RNA timer configuration in at least one of an SDT termination indication or an SDT subsequent transmission indication; and
initiate an RNA timer based on the updated RNA timer configuration; and
wherein the SDT procedure is terminated after a subsequent transmission period of the SDT procedure.

16. The UE of claim 15,
wherein the one or more processors are further configured to cause the UE to:
receive, during a subsequent transmission period of the SDT procedure, an SDT subsequent transmission termination indication, wherein the SDT subsequent transmission termination indication includes an updated RNA timer configuration, wherein the SDT procedure is terminated after a subsequent transmission period of the SDT procedure, and wherein starting the RNA timer includes starting the RNA timer based on the updated RNA timer configuration.

17. The UE of claim 15,
wherein the one or more processors are further configured to cause the UE to:
detect expiration of the RNA timer; and
trigger, in response to detecting expiration of the RNA timer, an RRC resume procedure.

18. The UE of claim 15,
wherein the RNA timer configuration includes a duration or value of the RNA timer.

19. The UE of claim 15,
wherein the updated RNA timer configuration is received via RRC signaling.

20. The UE of claim 15,
wherein the updated RNA timer configuration is received via medium access control signaling.

* * * * *